United States Patent [19]

Maligne

[11] Patent Number: 5,439,079
[45] Date of Patent: Aug. 8, 1995

[54] AUXILIARY DRUM-BRAKE DEVICE WITH IMPROVED AUTOMATIC CLEARANCE ADJUSTMENT

[75] Inventor: Jean Charles Maligne, Aubervilliers, France

[73] Assignee: Bendix Europe Services Techniques, Drancy, France

[21] Appl. No.: 90,057

[22] PCT Filed: May 25, 1993

[86] PCT No.: PCT/FR93/00504

§ 371 Date: Jul. 30, 1993

§ 102(e) Date: Jul. 30, 1993

[87] PCT Pub. No.: WO93/25826

PCT Pub. Date: Dec. 23, 1993

[30] Foreign Application Priority Data

Jun. 5, 1992 [FR] France ................... 92 06949

[51] Int. Cl.6 .............................................. F16D 65/56
[52] U.S. Cl. ............................ 188/79.56; 188/196 BA
[58] Field of Search ............ 188/79.51, 79.55, 79.56, 188/79.57, 325, 328, 196 B, 196 BA, 79.63, 79.64, 79.59, 79.61

[56] References Cited

U.S. PATENT DOCUMENTS

| | | | |
|---|---|---|---|
| 3,128,849 | 4/1964 | Swift | 188/196 BA X |
| 3,216,533 | 11/1965 | Hagerty et al. | 188/79.56 |
| 3,294,202 | 12/1966 | Helvern | 188/196 BA X |
| 3,893,548 | 7/1975 | Bolenbaugh | 188/79.56 |
| 3,958,674 | 5/1976 | Borkowski | 188/340 |

FOREIGN PATENT DOCUMENTS

| | | |
|---|---|---|
| 0013674 | 8/1980 | European Pat. Off. . |
| 0085233 | 10/1983 | European Pat. Off. . |
| 1269424 | 5/1968 | Germany . |
| 2900158 | 7/1980 | Germany . |
| 2112884 | 7/1983 | United Kingdom ............ 188/79.56 |

*Primary Examiner*—Robert J. Oberleitner
*Assistant Examiner*—Peter M. Poon
*Attorney, Agent, or Firm*—Larry Palguta; Leo H. McCormick, Jr.

[57] ABSTRACT

This drum-brake device is equipped with an automatic clearance adjustment device comprising a click (12) actuating a toothed wheel (11) whose rotation gives rise to the lengthening of a spacer (9) disposed between two brake segments (1) and (2). The click is controlled by a linkage (16, 17, 18) sensitive to any relative motion of the shoes.

6 Claims, 2 Drawing Sheets

AUXILIARY DRUM-BRAKE DEVICE WITH IMPROVED AUTOMATIC CLEARANCE ADJUSTMENT

The present invention relates to a drum-brake device comprising:

a clevis;

first and second arcuate brake shoes having respective first and second ends facing one another;

an expander fastened to the clevis and actuatable to move apart the first ends of the two shoes;

a spacer of which the length is adjusted by a screw element and which holds the second ends of the two shoes at a distance from one another, and regulation means for regulating the length of the spacer in dependence on the wear of the shoes, said means comprising a toothed wheel fastened to the screw element, a rocking lever which carries a click and is pivoted on the second shoe and which is capable of turning the toothed wheel in a direction such as to lengthen the spacer, and a linkage for actuating the rocking lever, said linkage in turn comprising a lever pivoted at a point on the second shoe and two rods connected by said lever, the first rod having a first end pivoted on a support point and a second end pivoted on the lever to move the latter in the event of the actuation of the expander, and the second rod having a first end pivoted on the lever and a second end pivoted on the rocking lever such as to transmit to the latter the motion of the lever.

Devices of this kind are known in the prior art for use in land motor vehicles, and a similar device is for example illustrated in DE Patent 1 269 424, in which the linkage effectively comprises two rods and one lever, unlike for example the devices of U.S. Pat. Nos. 3,958,674 and 3,216,533, in which a simple cable is used as the linkage.

Nevertheless, brake devices designed in accordance with an arrangement of this kind are known only in applications in which they constitute the main braking member and in which the clearance adjustment is effected and can occur only through the action of a rotation of the braked wheels and the corresponding drums.

The problem which the present invention is provided to solve consists in adapting the automatic clearance adjustment system used in known devices such as to make it also usable for auxiliary brake devices, particularly those consisting of a mechanically actuated drum-brake (for example a hand brake) and housed inside a disk-brake, in accordance with an arrangement known by the English language expression "drum-in-hat", and having no fixed point, that is to say adopting the design termed "duo-servo".

To achieve this adaptation numerous difficulties have to be overcome.

Firstly, except in emergencies, it is always during stops that the auxiliary brake is engaged, so that the stresses to which the shoes are subjected are very different from those occurring in a main brake, particularly because of the absence of the phenomenon of wrapping which, in the duo-servo design, is applied to both segments at the same time.

Moreover, precisely because it is normally applied only during stops, the auxiliary brake is subject to only minimum wear, so that the clearances to be adjusted for are much smaller than in a main brake.

Finally, an auxiliary brake is generally actuated by a mechanical expander, which develops only a relatively small force compared with that developed by a hydraulic actuator, thus leading to a further limitation of the movement of the brake shoes.

In order to overcome these difficulties the brake device of the invention is essentially characterized in that the support point of the first rod is a point on the first brake shoe, whereas the first and second shoes are mounted floating on the clevis, this arrangement making it possible to adjust for clearance by operating the brake either when the vehicle is braked and at rest or during forward or re- verse motion.

The device thus constituted can in particular be actuated by an expander of a mechanical type.

The pivot point of the lever, the second end of the first rod, and the first end of this same rod preferably define a first angle close to 120° or greater than that value.

In a preferred embodiment of the invention, the pivot point of the lever is substantially equidistant from the second end of the first rod and from the first end of the second rod, and the first and second ends of the second rod define a direction at least close to that of the bisector of said first angle.

For example, the lever comprises essentially a ring connected to the second shoe by a hook passing through an aperture made in said shoe, and the second end of the first rod and the first end of the second rod are looped over the ring such as to engage around it.

The invention will now be described by way of example with reference to the accompanying drawing in which.

Figure 1:
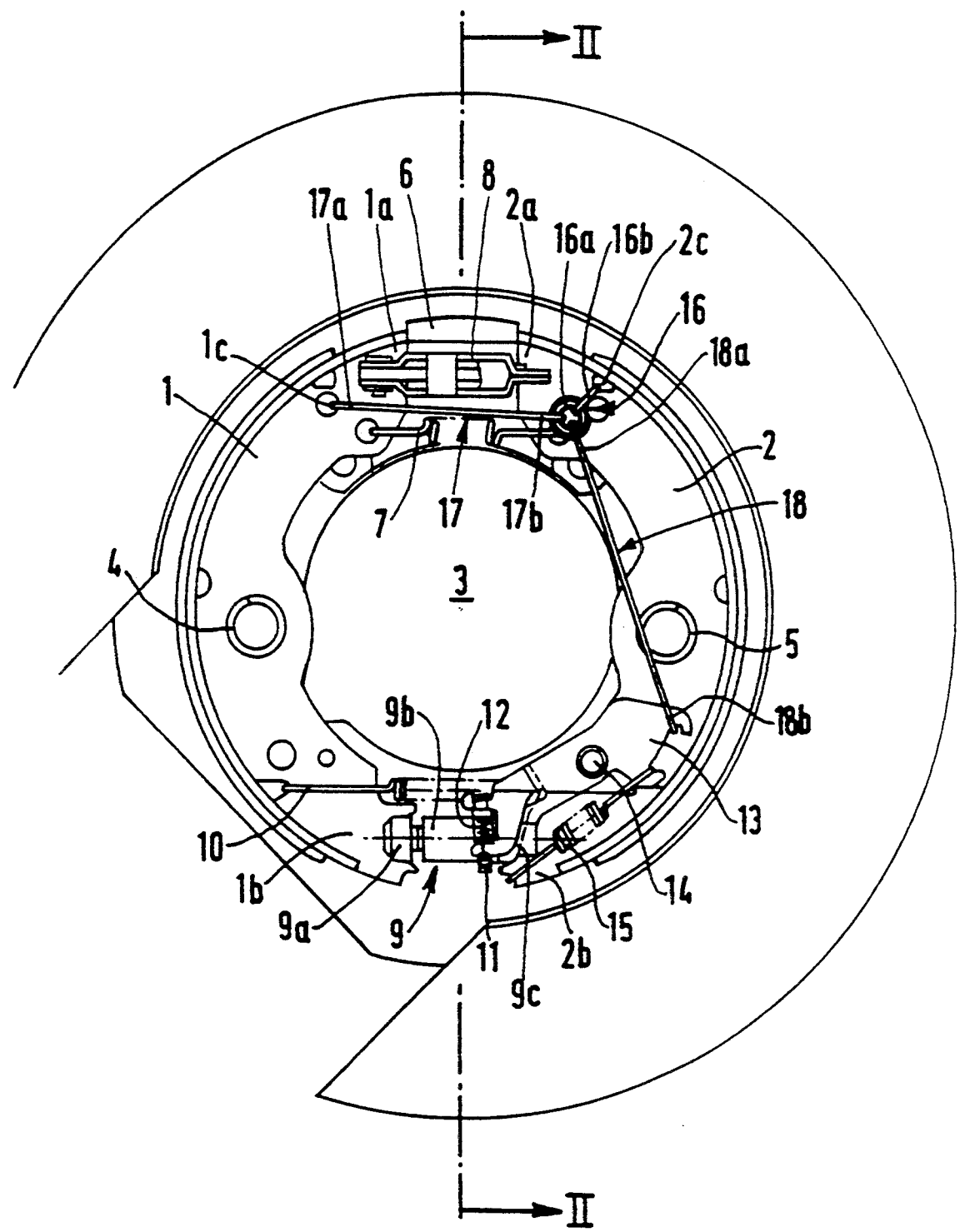
FIG. 1 is a front view of a device according to the invention.

The device of the invention comprises a first and a second brake shoe 1 and 2 having the shape of an arc of a circle, mounted floating on a clevis 3, and having first ends 1a, 2a and second ends 1b, 2b facing one another.

Each shoe is connected to the clevis by a spring such as 4, 5, and the first ends 1a, 2a of the shoes 1 and 2 normally rest on a support 6, fastened to the clevis, through the action of a spring 7 bringing them towards one another.

A mechanical expander 8, likewise fastened to the clevis, is nevertheless provided to move apart said ends 1a, 2a and to separate the shoes 1 and 2 against the force of the spring 7, in order to apply them against the inner face of a brake drum (not shown).

The second ends 1b, 2b of the shoes 1 and 2 are held at a distance from one another by a spacer 9 mounted floating relative to the clevis 3. The length of this spacer, which consists of a screw 9a, a nut 9b and an end-piece 9c, can be adjusted by turning the nut 9b in order to adjust for the wear of the shoes, by separating the second ends 1b, 2b of said shoes from one another against the force of a spring 10.

For this purpose, the nut 9b is provided with a toothed wheel 11 capable of cooperating with a click 12 carried by a rocking lever 13.

Said rocking lever is pivoted on the second shoe 2 about a pin 14 such as to be able to be pulled by a linkage against the force of a spring 15, and thus to undergo a pin 14 rotation, in the course of which the click 12 drives the toothed wheel 11.

The linkage in question, on which the main characteristics of the invention concentrate, comprises a lever 16 pivoted at a point 2c on the second shoe and connecting together a first and a second rod 17 and 18.

The first end 17a of the first rod 17 is pivoted on a support point 1c on the first shoe 1, and the second end 17b of this same rod is pivoted on the lever 16.

The second rod 18 is in turn pivoted by its first end 18a on the lever 16 and by its second end 18b on the rocking lever 13, in order to transmit to the latter the motion of the lever 16.

The lever 16 is preferably in the form of a ring 16a connected to the second shoe 2 by a hook 16b passing through an aperture made in said shoe, one point on said hook constituting the pivot point 2c.

Figure 2:
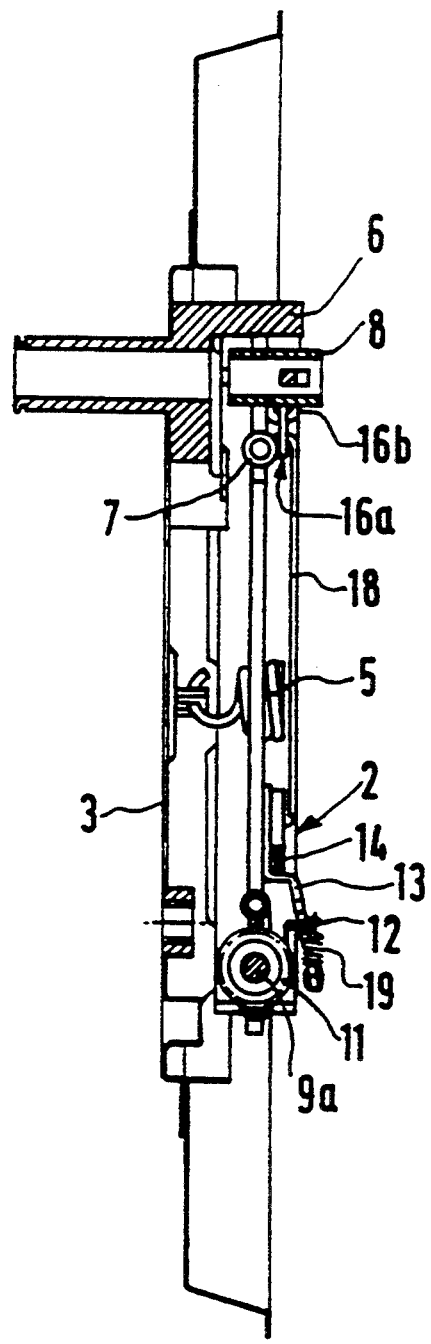
FIG. 2 is a view in section of this same device, taken on the line II—II in FIG. 1.

As shown in FIG. 2, the second end 17b of the first rod 17 and the first end 18a of the second rod 18 are looped over the ring 16a such as to engage around it, this arrangement making it possible to form very simply a linkage in which friction is negligible.

Furthermore, the pivot point 2c of the lever 16, the second end 17b of the first rod, and the first end 17a of this same rod form an angle close to 120° or even greater than that value, and the first and second ends 18a, 18b of the second rod 18 define a direction at least close to that of the bisector of that angle.

As a result of this arrangement, any separation of the points 1c and 2c from one another will give rise, because of trigonometrical relationships, to a motion of greater amplitude of the rod 18.

For this reason this arrangement thus contributes towards permitting the use of a lever whose pivot point 2c is substantially equidistant from the second end 17b of the first rod 17 and from the first end 18a of the second rod 18, that is to say of a lever which may adopt the described form of a ring and a hook.

The operation of the device described is as follows.

On the actuation of the expander 8, the shoes 1 and 2 move off their support 6.

When this motion occurs, the rod 17 and the hook 16b tend to come into alignment and, with the aid of the ring 16a and the second rod 18, impart an anticlockwise rotation to the rocking lever 13 about its pin 14.

The click 12, loaded by a spring 19 and guided laterally on the toothed wheel 11, slides over the tooth on which it rests, and then drops into the following space.

During this operation the nut 9b does not turn if the springs 7, 10 and 15 produce between the nut 9b and the screw 9a an anti-rotational couple greater than the couple due to the friction of the click 12 on the toothed wheel 11.

On the return, the shoes 1 and 2 return towards one another and onto their support 6. The rod 17 and the hook 16b resume their initial positions, freeing the rocking lever, which turns in the clockwise direction under the effect of the spring 15.

With the aid of the click 12 this motion drives a rotation of the nut 9b, the drive couple provided by the spring 15 being greater than the anti-rotational couple of the nut 9b.

The rotation of the latter causes a lengthening of the spacer, thus separating the shoes 1 and 2 at their second ends 1b, 2b and compensating for the wear of said shoes.

I claim:

1. A drum-brake device comprising:
   a clevis;
   first and second arcuate brake shoes having respective first and second ends facing one another;
   an expander fastened to the clevis and actuatable to move apart the first ends of the two shoes;
   a spacer of which the length is adjusted by a screw element and which holds the second ends of the two shoes at a distance from one another; and
   regulation means for regulating the length of the spacer in dependence on the wear of the shoes, said means comprising a toothed wheel fastened to the screw element, a rocking lever which carries a click and is pivoted on the second shoe and which is capable of turning said toothed wheel to lengthen the spacer, and a linkage for actuating the rocking lever, said linkage comprising a second lever pivoted at a point on the second shoe and two rods connected with said second lever, the first rod having a first end pivoted on a support point and a second end pivoted on said second lever to move the latter in the event of the actuation of the expander, and the second rod having a first end pivoted on the second lever and a second end pivoted on the rocking lever to transmit to the latter the motion of the second lever, characterized in that the support point is on the first shoe whereas the first and second shoes are mounted to float on the clevis.

2. The device according to claim 1, characterized in that the pivot point of the second lever, the second end of the first rod, and the first end of the first rod define a first angle close to or greater than 120.

3. The device according to claim 2, characterized in that the pivot point of the second lever is substantially equidistant from said second end of said first rod and from the first end of the second rod.

4. The device according to claim 3, characterized in that the first and second ends of the second rod define a direction at least close to that of the bisector of the first angle.

5. The device according to claim 1, characterized in that said second lever comprises essentially a ring connected to the second shoe by a hook passing through an aperture made in the second shoe, and in that the second end of the first rod and the first end of the second rod are looped over the ring such as to engage the ring.

6. The device according to claim 1, characterized in that the expander is a mechanical expander.

* * * * *